Jan. 21, 1941.                    W. R. WILEY                  2,229,233
            APPARATUS FOR INSTALLING CLIPS IN MOLDINGS
                          Filed Dec. 2, 1937

INVENTOR
William R. Wiley.
BY
Harness, Dickey & Pierce.
ATTORNEYS.

Patented Jan. 21, 1941

2,229,233

UNITED STATES PATENT OFFICE 2,229,233

APPARATUS FOR INSTALLING CLIPS IN MOLDINGS

William R. Wiley, Detroit, Mich.

Application December 2, 1937, Serial No. 177,783

1 Claim. (Cl. 29—84)

This invention relates to moldings of the type employed for decorative or finishing purposes and while in the broader sense it is applicable to moldings generally, it is particularly adaptable for use with the moldings employed in connection with automobile bodies.

Objects of the invention include the provision of apparatus for use in connection with the assembling of securing clips to molding; the provision of apparatus by means of which securing clips may be secured in predetermined spaced relationship with respect to each other to a molding; the provision of apparatus by means of which a plurality of molding securing clips may be supported in predetermined spaced relation and in a manner to collectively receive a strip of molding thereon; and the provision of apparatus of new and novel character for supporting a plurality of molding securing clips in predetermined position with respect to each other.

Other objects of the invention include the provision of a method of assembling clips to a strip of molding; the provision of a method of assembling a plurality of securing clips to a strip of molding including supporting a plurality of clips in a predetermined relation with respect to each other and then applying the molding to the clips; the provision of a method of securing a molding to an object provided with a plurality of clip securing openings including the steps of supporting a plurality of clips in spaced relation to each other corresponding to the spacing of the openings in the object, applying the molding to the clips, and then applying the clips and the molding as a unit to the object.

The above being among the objects of the present invention the same consists in certain novel features of construction and combination of parts, together with certain novel steps of operation, to be hereinafter described with reference to the accompanying drawing, and then claimed, having the above and other objects in view.

In the accompanying drawing which illustrates a suitable embodiment of the present invention and in which like numerals refer to like parts throughout the several different views, Figure 1 is a top plan view of a fixture for supporting a plurality of molding securing clips therein in predetermined spaced relation with respect to each other, a portion of a strip of molding being shown in assembled relation with respect to a portion of the clips supported by the fixture;

While the present invention is applicable for use in connection with moldings of any type employing clips to secure it in position upon an object, one of the main uses of such molding is in connection with automobile bodies and, accordingly, for the purposes of simplicity in description only, the present description of the invention will be limited to its application to automobile bodies, its application to other objects being readily recognized by those skilled in the art from the teachings herein.

As is well understood by those skilled in the art, modern types of moldings employed in connection with automobile bodies to conceal joints therein, or employed solely for decorative purposes, are usually formed from sheet metal bent to any desirable cross-sectional configuration but usually such as to form a substantially hollow molding having a slot in its rear face with which securing clips of suitable type are adapted to be received. The automobile body at or adjacent the intended line of securement of the molding thereto is provided with a row of spaced openings or holes therein by means of which the clip is attached to the body and thereby in turn attaches the molding to the body. The types of clips employed for securing the molding to the bodies in general vary as much in form as the cross-sectional configuration of the moldings themselves. In some instances the clips are so constructed and arranged as to permit their insertion through corresponding openings in the body so as to be releasably secured to the body against inadvertent withdrawal and usually so co-acting with the body as to maintain the molding in yieldable contact against the body. In other types the clip itself is provided with an opening therethrough for reception of a screw or bolt which is also adapted to project through the corresponding opening in the body for the purpose of securing the clip and, therefore, the molding to the body. This latter type is shown in the accompanying drawing merely by way of illustration of the broad principles of the invention and those skilled in the art will readily recognize such changes in the apparatus and method of application as may be required to adapt the present invention to different forms of clips, moldings and methods of attachment.

Figure 1:
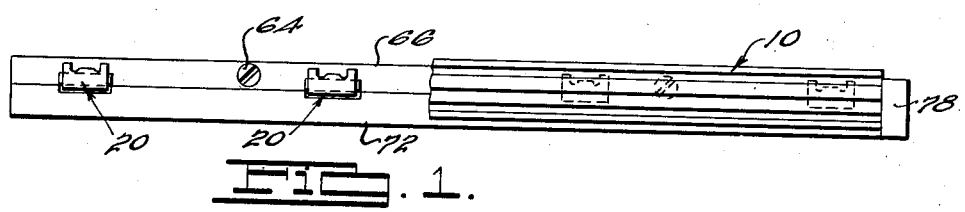
Figure 2:
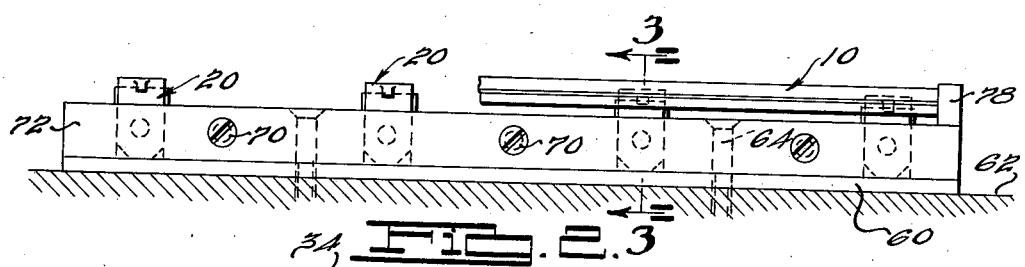
Fig. 2 is a side elevational view of the apparatus shown in Fig. 1.
Figure 3:
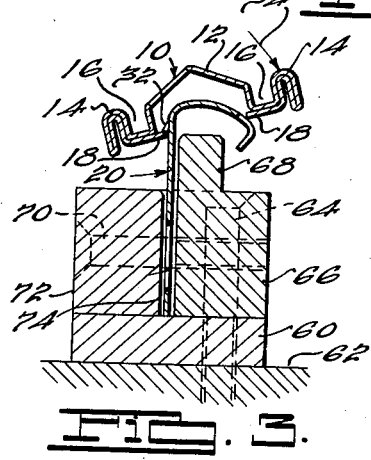
Fig. 3 is an enlarged transverse sectional view taken on the line 3—3 of Fig. 2 and illustrating the manner in which the molding is assembled to the clip, the molding being shown in a position which it assumes during the assembly but before it is completely assembled to the corresponding clip.
Figure 4:
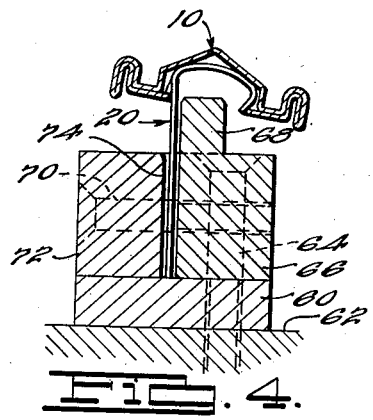
Fig. 4 is a view similar to Fig. 3 but showing the molding completely assembled to a clip.

Referring particularly to Figs. 3 and 4 the particular form of molding shown in the accompanying drawing by way of illustration only will be seen to comprise a member indicated generally at 10 which includes a main central portion 12 comprising two angularly directed faces, and outer marginal bead portions 14 spaced from the central portion 12 by grooves 16. The molding 10 is formed from sheet metal in such a manner that the bead portion 14 and the outer and bottom wall of the channel 16 are of double thickness, the lower thickness of which projects inwardly toward the center of the molding 10 beyond the inner side walls of the grooves or channels 16 so as to form shoulder providing portions 18 projecting inwardly beyond the inner side walls of the grooves or channels 16 a small but material distance.

Figure 5:
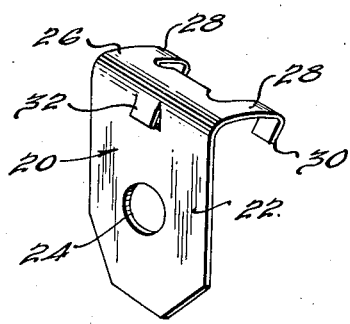
Fig. 5 is an enlarged perspective view of the clip shown by way of illustration of the present invention in the preceding views.

The clips which are shown in the accompanying drawing by way of illustration are of the character disclosed best in Fig. 5 and indicated generally at 20. Each clip includes a substantially planular main body portion 22 having an opening 24 therein for the passage of a suitable securing means, and a bent over end portion 26 of somewhat curved conformation terminating in a pair of spaced outwardly projecting fingers 28 the terminal portions of which are bent downwardly and inwardly as at 30. The main body portion 22 adjacent the portion 26 is provided with an out-struck tongue or lug 32 bent outwardly from the plane thereof in a direction opposite to the direction in which the portion 26 is bent and in such a manner as to provide an abutment facing the opposite end of the clip. It will be understood that the material from which the clip 20 is formed is resilient and the character of the fingers 28 are such as to render them more or less readily yieldable under the influence of pressure applied thereto. The distance between the end portion 30 of the fingers 28 and the main body portion 22 of the clip 20 is slightly greater than the distance between the opposed edges of the shoulder forming portions 18 of the clip so that the upper end of the clip shown in Fig. 5 may be forced into the interior of the molding 10, the fingers 28 yielding to permit this insertion. The method of assembling the clip and molding is best illustrated in Fig. 3 and the final assembled position of these parts best shown in Fig. 4.

Referring to Fig. 3 it will be noted that in assembling the molding and a clip the molding is positioned with the plane of its lower face at such an angle with respect to the plane of the main body portion 22 of the clip that one of the shoulder forming portions 18 of the molding may be disposed below the lug 32 which thereafter hold the corresponding side of the molding from riding up the corresponding side of the clip. Thereupon the molding is rotated relative to the clip in the direction of the arrow in Fig. 3, the fingers 28 yielding until they spring upwardly into the interior of the molding over the marginal edge of the righthand shoulder forming portion 18 whereupon the parts assume the relation illustrated in Fig. 4. From an inspection of Fig. 4 it will be noted that the terminal portions 30 of the fingers 28 are disposed at such an angle with respect to the main body portion 20 that when in position the natural resiliency of the fingers 28 co-acting through the angular faces of the terminal end portions 30 against the corresponding edge of the corresponding shoulder forming portion 18 tends to draw the molding 10 tightly into engagement with the end of the clip and, therefore, yieldably but firmly effects a securement of the two parts together.

Figure 6:
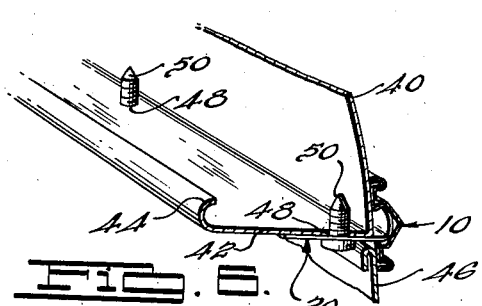
Fig. 6 is a fragmentary partially broken, partially sectioned perspective view illustrating the molding and clip shown in the preceding views applied to an object.

To illustrate the application of the clips and moldings thus far described to an automobile body reference may be had to Fig. 6 in which it may be assumed that the sheet metal panel 40 is a portion of the movable panel of an automobile hood and is provided with an inwardly turned flange 42 along its lower margin which flange is preferably inwardly and upwardly curled as at 44 along its inner margin to render the flange more rigid. It may be assumed that the lower edge of the hood 40 shown is adapted to cooperate with the upper edge of a stationary hood side panel 46 to provide the usual engine enclosure and that it is desired to conceal the joints between the hood 40 and panel 46 by means of the molding previously described. In such case the flange 42 will be provided with a plurality of holes or openings 48 therein at predetermined spaced intervals and at a predetermined and desired distance from the lower outer edge face of the panel 40. The inward spacing of the holes with respect to the outer face of the panel 40 will be such that when a strip of molding 10 provided with a plurality of clips 20 is applied thereto suitable securing means, for instance such as sheet metal screws 50, may be projected through the openings 24 in the various clips 20 and threaded into the openings 48 so that the molding 10 will be secured in firm contact with respect to the outer face of the hood panel 40 as shown.

Prior to the practice of the present invention it was the usual practice in applying moldings of the general character shown by suitable clips such as those previously described to an automobile body, to insert a plurality of clips in the molding at approximately the spacing of the openings for their reception in the automobile body, apply one of the clips to the corresponding opening, shift the molding relative to the clip until the molding was arranged in its desired longitudinal position on the body, and then shift the remaining clips longitudinally of the molding until they were properly aligned with their respective openings and then insert them or otherwise secure them relative to such opening. Such a procedure involves a considerable amount of labor in the application of moldings to an automobile body, it is a relatively slow procedure and the projecting ends of the clips are liable to scratch or otherwise mar the finish of the body during application of the molding strip to the body.

The holes or openings in the automobile body adapted to receive or otherwise cooperate with the clip to secure the clip and the molding thereto are, of course, die punched and are, therefore, of identically the same arrangement, location and spacing in all bodies of the same model. In accordance with the present invention advantage has been taken of this fact in order to provide an apparatus by means of which the clips may be assembled to the molding in properly spaced relation with respect to each other, as well as to one end of the molding, so that the molding and clips may all be assembled together in one unitary structure in which clips are exactly spaced in accordance with the holes or openings in the body, are arranged at a predetermined distance with respect to one end of the molding strip so that when the molding strip with the clips assembled to it is applied to the body the clips will all be accurately aligned with respect to their respective openings in the body and thus permit the moldings to be applied in a quick, easy and accurate manner with a minimum of labor and with a minimum of danger of scratching the finish of the body.

Apparatus constructed in accordance with the present invention to accommodate the particular clips and molding strip shown in the drawing and previously described is illustrated in Figs. 1, 2, 3 and 4. This apparatus or assembly fixture comprises an elongated base 60 of rectangular section which may be secured to a table, bench or the like 62 upon which the fixture may be suitably supported. Secured to the upper face of the base 60 by means of screws 64 or other suitable fastening means and which screws 64 may extend down through the base 60 and into the table or bench 62 for the purpose of fixing the fixture thereto, is an elongated member 66 of rectangular cross-section, shown as being arranged with its major axis perpendicular to the upper face of the base 60, of substantially half the width of the base 60 and secured thereto with its outer face in flush relation with respect to a side face of the base 60. At properly spaced intervals along the length of the member 66 corresponding with the spacing of the openings in the automobile body which are adapted to receive or cooperate with the clips on a strip of molding, in the case shown corresponding with the spacing of the openings 48, the member 66 is provided with an upstanding projection 68 on its upper face, each projection 68 being of a length measured longitudinally of the member 66 approximately equal to the width of the clip 20 or slightly greater than such width as indicated. Its thickness, measured in a direction transversely to the length of the member 66 is less than the distance between the terminal portions 30 of the fingers 28 and the main body portion 22 of the clip 20 so that its upper end portion may be readily received between the terminal portion 30 and the main body portion of the clip. Also seating on the upper face of the base 60 on that side thereof opposite the member 66 and rigidly clamped to the member 66 by means of screws 70 is a member 72 corresponding in length to the base 60 and member 66 and of a height corresponding with the height of the main body portion of the member 66 so that its upper surface is flush with the upper surface of the main body portion of the member 66. The inner face of the member 72, that is the face which contacts the inner face of the member 66, at spaced intervals corresponding with the projection 68 and in line with each projection 68, is cut away, recessed or notched out as at 74 so as to provide a pocket between the members 66 and 72 in line with each projection 68 and which pocket opens upon the upper face of the fixture. Each of the pockets formed by the grooves 74 is of a width and thickness so as to loosely receive the main body portion 22 of a clip 20 therein, the looseness being such as to permit ready insertion and removal of the clips 20 in and from the corresponding pockets, but at the same time not loose enough to permit a material amount of shifting of the clips therein.

The height of the members 62 and 72, as illustrated in Figs. 3 and 4, is such that when a clip 20 is inserted in one of the pockets formed by the grooves 74 its lower end portion will rest upon the upper face of the base 60 while the bent over end portion 26 and arms 28 will be upwardly spaced from the upper face of the corresponding projection 68 sufficiently to permit that degree of flexing of the arms 28 to permit application of a molding such as 10 thereto. At one end of the fixture a vertically directed block 78 is rigidly fixed to the upper face of the member 66, the block 78 serving as a stop or abutment for one end of a strip of molding 10 when being applied to the clips 20 in the fixture and thus provides a means for locating the clips in predetermined relation longitudinally of the molding.

In operation, assuming the fixture is of a length corresponding to the length of a piece of molding desired to be applied to an automobile body and that the fixture includes a plurality of projections 68 spaced from each other a distance corresponding with the holes in the body which are to receive or to cooperate with the various clips, and the stop surface 78 is arranged in predetermined relationship with respect to the next adjacent clip receiving recess of the fixture, one clip is inserted in each of the recesses or pockets and, as in the case illustrated where the clips are not of uniform transverse section, with all the clips disposed in the same relation in the fixture, a piece of molding is manipulated so as to first bring one end of it into contact with the stop surface 78 and then is pressed down on to all of the clips in the fixture so that the clips are secured thereto. In the case of the particular molding and clips shown by way of illustration this is accomplished as previously described by first engaging one of the shoulder forming portions 18 under the lugs 32 of each of the clips 20 and then rotating the molding about the point of contact with such lugs until the end of the clips snaps into the interior of the molding. The projections 68 in such case serve to reinforce the main body portions of the clips 20 against excessive bending during this operation. As soon as the clips and the molding are all assembled together in this manner the molding with the clips secured thereto is bodily removed from the fixture with the clips and the whole assembly is then applied to the automobile body with the assurance that the holes 24 in the clips 20 will align with the corresponding openings 48 in the body and that the molding itself will be properly positioned in a lengthwise direction as desired and intended in the finished product.

It is needless to explain that the grooves or notches 74 forming the various clip receiving pockets may, of course, be varied in size and form to accommodate any type or size of clip, that the spacing of the pockets in the fixture may be varied to accommodate the spacing of the openings in any particular body structure, and that the specific manner of applying the molding to the clips in the fixture may vary according to the particular type of clip and molding to which it is desired to adapt the invention.

Formal changes may be made in the specific embodiment of the invention described without departing from the spirit or substance of the broad invention, the scope of which is commensurate with the appended claim.

What I claim is:

Apparatus for use in the assembly of securing clips, each having an offset head and an elongated leg, to a hollow molding strip having a shouldered slot to receive the heads of the clips, including, in combination, an elongated member having a planular substantially unbroken face, a second member having a planular face fixed in approximate contact with the first mentioned face, said second member having a plurality of notches formed in said planular face thereof at predetermined points in the length thereof cooperating with the first mentioned member to form pockets for loosely receiving the legs of said clips therein, means forming a bottom for said pockets serving as a stop for the ends of said clips whereby to predetermine the distance which the heads of said clips will project above the upper surfaces of said members, and upwardly projecting means on the first mentioned member adapted to underlie the offset heads of clips received in said pockets and aid in limiting movement of said clips during application of said molding strip thereto.

WILLIAM R. WILEY.